April 18, 1939. E. JANETSCHKE 2,155,090
REGULATOR SYSTEM FOR PARALLEL OPERATION OF COMMUTATOR RECTIFIERS
Filed June 10, 1938
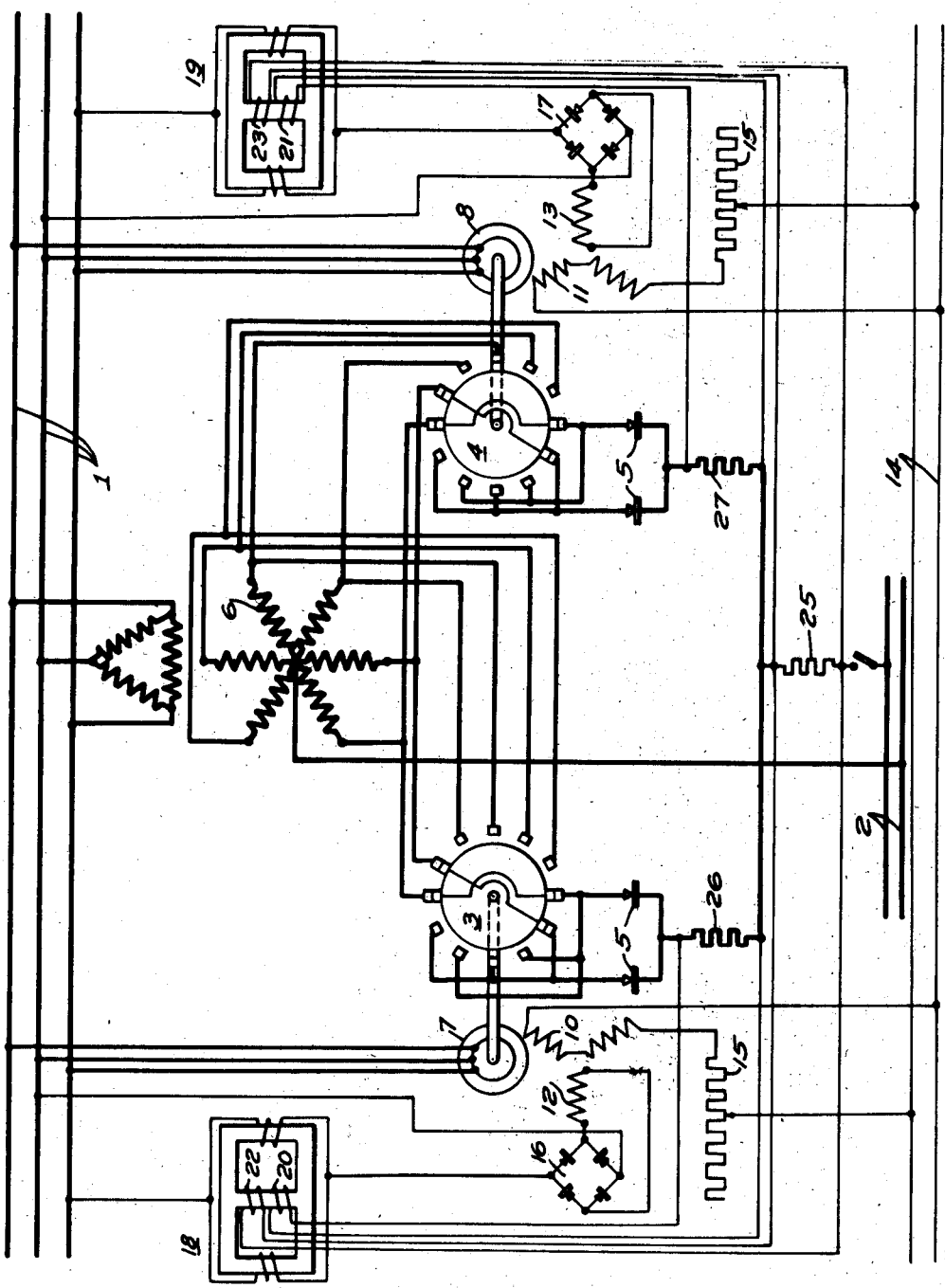
WITNESSES:
E. A. McCloskey
Nw. C. Groome
INVENTOR
Erwin Janetschke
BY
S. A. Strickett
ATTORNEY Patented Apr. 18, 1939

2,155,090

UNITED STATES PATENT OFFICE 2,155,090

REGULATOR SYSTEM FOR PARALLEL OPERATION OF COMMUTATOR RECTIFIERS

Erwin Janetschke, Berlin-Charlottenburg, Germany, assignor to Westinghouse Electric & Manufacturing Company, East Pittsburgh, Pa., a corporation of Pennsylvania Application June 10, 1938, Serial No. 213,040
In Germany June 10, 1937

5 Claims. (Cl. 175—364)

My invention relates to an electrical conversion system, and particularly to a control system for parallel operation of commutator rectifiers, particularly rectifiers in which electrical valves or other suitable devices are connected in series with the commutator elements to reduce the commutating duty of the mechanical contacts.

The internal resistance of commutator rectifiers which comprises the resistance in the transformer, the transfer resistance at the switching contacts and the resistance of the necessary current limiting devices is, in general, extraordinarily small. However, it is subject to fluctuations in value, these fluctuations being of the order of a high percentage of the internal resistance of the rectifier devices. Resistance fluctuations arise from several facts, but essentially from fluctuations of the transition resistance of the contact device which may assume definite values depending on the condition of the contact surfaces and the order of magnitude of the contact pressure. For these reasons, considerable difficulties exist in securing proper parallel operation of a plurality of commutator type rectifiers as the fluctuation of the internal resistance causes undesirable division of the load between the parallel rectifier devices.

According to my invention, these difficulties are eliminated by varying the moment in the conductive half cycle at which the contact elements engage. For example, the overloaded element makes contact at a later time in the conducting half cycle while the underloaded contact is advanced to make contact at an earlier instant in the conducting half cycle. In this manner the variations in current through the individual elements may be compensated so that the elements all assume substantially their proper share of the total load regardless of the fluctuation of internal resistance of the commutator devices.

In the system according to my invention the individual commutator elements are supplied with individual driving motors which operate at synchronous speed but are provided with a plurality of field elements creating a field composed of two elements in quadrature, so that the field axis may be shifted by varying the strength of different portions of the field. In this manner the relative angular position of the driving motor and its associated contact device may be shifted as desired to control the angle in the half cycle at which commutation takes place.

In order to secure this variation in contact angle I have provided a field winding comprising two portions, preferably in quadrature with each other, and maintain one of the windings at a substantially constant excitation value while the excitation of the other winding is varied in proportion to the variation in the amount of current carried by the associated contact device.

It is accordingly an object of my invention to provide a system for operating commutator type rectifiers in parallel.

It is a further object of my invention to provide a control system for varying the commutation angle of individual contact devices in dependence upon the division of load between the commutator elements.

Other objects and advantages of my invention will be apparent from the following detailed description, taken in conjunction with the accompanying drawing, in which the figure is a schematic illustration of a rectifier system embodying my invention.

In the illustrated embodiment of my invention, electrical energy is transferred between an alternating-current circuit 1 and a direct current circuit 2 by means of a plurality of parallel commutator type rectifiers 3 and 4, each of the rectifying devices being provided with series connected electric valves 5, such as illustrated in my copending application Serial No. 162,795, the current being distributed to the individual contact elements of both of the commutator devices 3 and 4 by means of suitable transformer device 6 herein illustrated as a six-phase diametrical transformer, although obviously any suitable transformer may be utilized.

Each of the commutator devices 3 and 4 is driven by suitable motors 7 and 8 which operate at synchronous speed. While an especially wound motor may be used having two field windings in quadrature with each other, I have found that the wound rotor type of induction motor may be utilized by using portions 10 and 11 of the wound rotor windings as one of the field elements of each motor 7 and 8 and another portion 12 of the wound rotor winding as the remaining field elements.

The first portions 10 and 11 of the field windings are excited from a suitable source preferably an auxiliary direct current bus 14 by means of suitable control resistors 15. The remaining portions 12 and 13 of each of the field windings is supplied with current from an alternating current source, preferably the alternating current circuit 1 by means of suitable rectifying devices herein illustrated as a full wave or Graetz connected rectifiers 16 and 17.

In order to control the current flowing in the second mentioned portions 12 and 13 of the field windings, current limiting chokes 18 and 19 of the premagnetized type are inserted in the individual alternating current leads from the alternating current source 1 to the rectifying devices 16 and 17. The premagnetized chokes 18 and 19 are each provided with two pre-magnetizing windings 20, 21, 22 and 23, one of each, 20 and 21, being connected in such a manner as to receive a current proportional to the full load current of the total rectifying system. While this could obviously be done by carrying the full current through the windings 20 and 21 on each of the current limiting chokes 18 and 19, I prefer to insert a resistor shunt 25 in the output circuit of the rectifier and to utilize the potential drop across this shunt 25 to supply the pre-magnetizing coils 20 and 21.

The second pre-magnetizing elements 22 and 23 receive currents proportional to the current carried by the individual commutator device 3 or 5 operated by the associated motor 7 or 8. Likewise, I prefer to insert shunts 26 and 27 in series with each of the individual commutator devices 3 and 5 and to use the potential drops across these shunts 26 and 27 as the exciting current of the pre-magnetizing elements 22 and 23, respectively.

In the operation of the system according to my invention, the commutator elements 3 and 4 operate in synchronism with each other and if there is no variation in the current between the respective commutator devices 3 and 4, they will operate at the same angle in the conducting half cycle. However, if the internal resistance of one of the commutator devices should vary, or if, for any reason, the division of current between the commutator devices should vary, the associated pre-magnetizing windings would be affected to vary the current transmitted to one element of the quadrature field, so that the magnetic axis of the field would be shifted, thereby changing the angle in the half cycle at which commutation would take place.

Assuming for example that the left-hand commutator element 3 should carry less than its proportionate value of the total current, the drop across the resistor element 26 associated therewith would decrease so that the premagnetizing winding 22 would receive less energy allowing more current to flow through the current limiting choke 18 to the rectifying device 16, and hence to the portion 12 of the field winding. This increases the strength of that particular portion 12 of the field winding, shifting the magnetic axis of the rotor, thus advancing the commutating angle in the conductive half cycle of the rectifier device 3 so that this particular commutator device 3 tends to increase its share of the load at the same time the premagnetizing winding 23 associated with the shunt 27 in series with the right-hand element 4 receives an additional current, so that it tends to decrease the current flowing to the motor associated with the right-hand commutator device 4, permitting a shift in the axis of the magnetic field of this motor 8 which delays the commutating angle of the right-hand commutator device 4, so that it tends to take less of the load, this action being maintained until each of the commutator devices 3 and 4 assumes the proper division of the load.

While for the purpose of illustration, I have shown and described a specific embodiment of my invention, it will be apparent to those skilled in the art that many changes and modifications can be made therein without departing from the true spirit of my invention or the scope of the appended claims.

I claim as my invention:

1. An electric current conversion system for transferring energy between an alternating current circuit and a direct current circuit comprising two commutator type rectifiers connected in parallel between said circuits, electric valves connected in series with each of said commutator devices to relieve the commutating duty thereon, individual synchronous motors for each of said commutator devices, a split field winding in said synchronous motors and means responsive to the division of load between said commutator devices for varying the current supplied to a portion of said field windings.

2. An electric current conversion system for transferring electric energy between an alternating current circuit and a direct current circuit comprising two rotating contact devices connected in parallel between said circuits, electric valves in series with said contact devices for relieving the commutating duty on the contact devices, individual driving motors for each of said contact devices, a split field winding in each of said motors, a portion of each of the split fields being connected to a common source of direct current, individual means for supplying current to the remaining portion of the split windings, each of said individual means including a source of alternating current, a rectifying device connected to supply said portion of the split winding from said alternating current source, a current limiting choke in series with said alternating current source and said rectifying device, two pre-magnetizing windings on said choke, one of said windings being traversed by a current proportional to the current through the associated contact device and the other being traversed by a current proportional to the load on the converting system.

3. An electric current conversion system for transferring electric energy between an alternating current system and a direct current system comprising a plurality of parallel operating mechanical rectifiers connected between said system, individual synchronous motors for driving said rectifiers and means responsive to the variation in current in the rectifying devices for controlling the instant of operation of said mechanical rectifier.

4. A control system for parallel operating commutator type rectifiers comprising an individual driving motor for each of said rectifiers, a two-part exciting winding in each of said motors, means for supplying a substantially constant current to one part of each of said exciting windings, means for supplying a variable current to the second part of each of said exciting windings including a source of alternating current, rectifying means connected between said source of alternating current and said second part of said exciting windings, current limiting chokes interposed between said source of alternating current and said rectifying devices, two pre-magnetizing windings on each of said chokes, one of said windings being traversed by a current proportional to the total current through the parallel operating rectifiers and the other being traversed by a current proportional to the current through the associated rectifier device.

5. A control system for parallel connected commutator type rectifier devices comprising synchronously operated driving motors for said rectifiers, means for shifting the magnetic axis of said driving motors for determining the angle in the half cycle at which the rectifiers become conducting, said means including a premagnetized choke in series with a portion of the field windings of said motors, means for varying the pre-magnetization in dependence upon the total load of rectifier system and means for varying the pre-magnetization in dependence upon the current in the individual rectifiers.

ERWIN JANETSCHKE.